United States Patent [19]

Hofer et al.

[11] 4,223,223
[45] Sep. 16, 1980

[54] BROAD-RANGE ION MASS SPECTROMETER

[75] Inventors: Wolfgang O. Hofer, Garching; Jürgen Kirschner, Aachen; Franz Thum, Garching, all of Fed. Rep. of Germany

[73] Assignee: Max-Planck-Gesellschaft zür Foerderung der Wissenschafter e.V., Goettingen, Fed. Rep. of Germany

[21] Appl. No.: 886,755

[22] Filed: Mar. 15, 1978

[30] Foreign Application Priority Data

Nov. 30, 1977 [DE] Fed. Rep. of Germany ....... 2753412

[51] Int. Cl.² ............................................ H01J 3/14
[52] U.S. Cl. .................................. 250/397; 250/398; 250/292
[58] Field of Search ............... 250/281, 282, 292, 296, 250/396, 397, 398, 399, 305; 313/359, 360, 361, 423

[56] References Cited

U.S. PATENT DOCUMENTS

| | | | |
|---|---|---|---|
| 2,264,709 | 11/1941 | Nicoll | 250/396 |
| 3,176,181 | 11/1965 | Blackler et al. | 250/396 |
| 3,376,449 | 4/1968 | Harrison | 250/396 |
| 3,500,042 | 3/1970 | Castaing et al. | 250/399 |
| 3,538,328 | 11/1970 | Strausser | 250/399 |
| 3,973,121 | 8/1976 | Fite et al. | 250/292 |
| 4,101,771 | 7/1978 | Hofer et al. | 250/398 |

Primary Examiner—Bruce C. Anderson
Attorney, Agent, or Firm—Frishauf, Holtz, Goodman & Woodward

[57] ABSTRACT

An essentially linear ion beam is derived from an ion emitting sample, including a high-frequency mass filter of essentially linear ion beam path, the ion beam path extending towards an ion-electron converter of general rotation symmetrical shape with respect to an axis, the ion-electron converter having an axis aligned with the essentially linear ion beam path and including an electrode which has an aperture traversed by the beam from the source after having passed through the filter, the electrode having a secondary electron-emissive surface on a side thereof which is averted from the ion source and formed as a smoothly curved concave surface defining a converter chamber, the ions which have passed through the aperture being reflected back unto the secondary electron-emissive surface to then being detected by an electrode positioned within the converter chamber. Bias voltage sources bias the electrode with respect to the secondary electron-emissive surface to provide for reflection of ions on the secondary electron-emissive surface.

11 Claims, 2 Drawing Figures

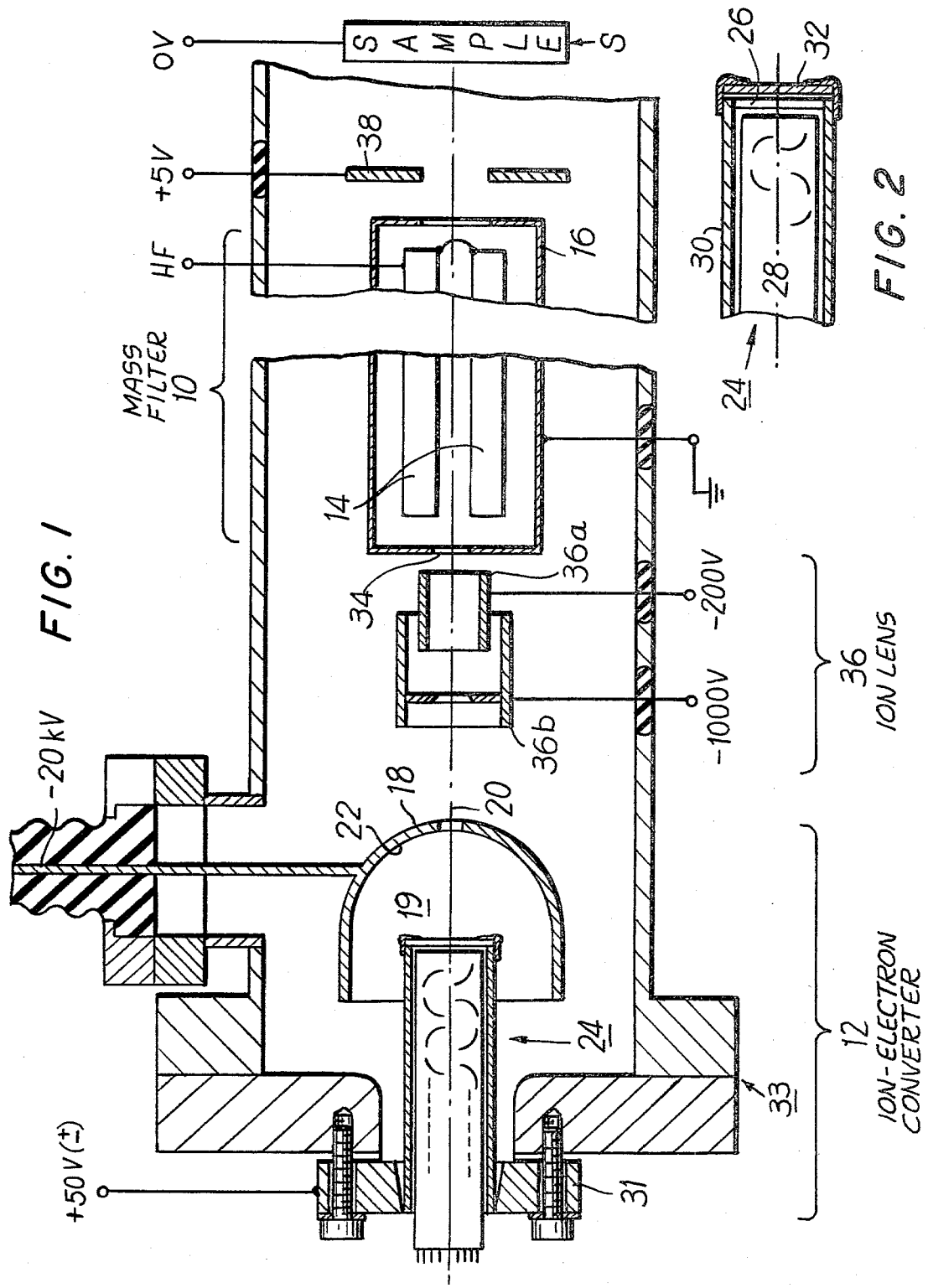

BROAD-RANGE ION MASS SPECTROMETER

REFERENCE TO RELATED PRIOR APPLICATION

U.S. Ser. No. 710,302, filed July 30, 1976, now U.S. Pat. No. 4,101,777 HOFER and KIRSCHNER, assigned to the assignee of the present application.

The present invention relates to a wide-range or broad-range ion mass spectrometer, and more particularly to a mass spectrometer in which ions from a sample are converted in an ion-electron converter to provide secondary electrons which are then detected, as a measure of the emitted ions.

Cross-referenced prior application Ser. No. 710,302, filed July 30, 1976, by co-inventors Hofer and Kirschner now U.S. Pat. No. 4,101,771, assigned to the assignee of the present application, describes an ion-electron converter which operates on reflection principle in which ions to be converted are supplied to the converter along an axis. The converter itself is a rotation-symmetrical body which includes a positively biassed electrode forming in general a portion of a secondary electron detector to which secondary electrons are directed. The ions are reflected to a secondary emission surface of the conversion electrode where they generate secondary electrons, to then be detected in the secondary electron detector. As described in the aforementioned application, the secondary emission surface is concave, for example a spherical segment, or an ellipsoid portion; it surrounds the secondary electron entry surface of the detector. Reference is made to the application for further details of construction.

A method to test material samples by means of secondary ion mass spectrometry (SIMS) has recently gained importance in which the surface of a test sample to be checked or investigated is subjected to a particle beam. The liberated secondary ions derived from the surface of the test sample are then analyzed by mass spectrometric apparatus. The mass spectrometer to be used in such investigations is subject to high requirements due to the substantial differences in energy of the secondary ions. It was thus previously necessary to use either complex double-focusing mass spectrometers (see, for example, J. Appl. Phys. 38, No. 13 (1967) 5277–5283). It was also tried to limit the energy range of the secondary ions by providing an energy selective limiter in advance of the mass spectrometer (see, for example, German Disclosure Document DE-OS No. 24 14 221). The energy analysis device used in a mass spectrometer in which energy selective apparatus is employed usually has an electric deflection field which, in addition to limiting or constricting the energy range of the secondary ions, has the advantage that due to deflection of the secondary ions between the test sample and the mass spectrometer, a direct line-of-sight connection is avoided between the sample and the ion sensing device of the mass spectrometer. Thus, particles which are not charged and which are emitted from the range of the test sample or target subject to impingement will not cause interferences in the ion sensing device. The energy and analyzing system however limits the effective input aperture of the mass spectrometer and limits space available between the mass spectrometer and the test sample of the target. This may be undesirable for various reasons. For example, a configuration with essentially linear or direct beam path between the test sample or target and the ion indicator would be desirable with respect to symmetry of mass lines, and certainly superior to systems having a configuration in which the beam pass is curved.

THE INVENTION

It is an object to provide a mass spectrometer in which ions of highly different energy levels can be sensed or tested or investigated, which is simple and permits a beam path which, essentially, is straight line or linear.

Briefly, the ion electron converter which is utilized is of the reflection type as set forth and described in detail in the above referred-to and cross-referenced application Ser. No. 710,302, now U.S. Pat No. 4,101,771 in combination with a high-frequency mass filter to provide a mass selective portion to provide overall a range selection. The high-frequency mass filter has an essentially straight line beam path. In a preferred form, the mass spectrometer is of the stabilized type described, for example, in Blauth "Dynamische Massenspektrometer" Publ. Vieweg & Sohn, Braunschweig 1965-("Dynamic Mass Spectrometers").

The combination of a high-frequency mass filter with a reflection-type ion-electron converter to indicate the presence of ions which passed through the high-frequency mass filter and which are thus selected in accordance with mass provides a particularly suitable and inexpensive mass spectrometer in which the inherent low-pass filter characteristics of the ion-electron converter with respect to the energy of the transduced ions and insensitivity with respect to neutral particles and photons complement the high-pass filter to thereby select ions having an energy in a given range characteristics of the high-frequency mass filter. These high-pass filter characteristics are not especially apparent, yet they are present and can be used. The specific combination has the additional particular advantage that the width and position of the energy interval can be controlled by controlling electrical potentials. This is in contrast to known mass spectrometers in which the energy range must be determined by mechanical apertures and thus cannot be readily changed or adjusted.

The arrangement is rotation symmetrical, that is, is symmetrical with respect to an axis, and thus permits a high degree of capture of ions. The mass lines are undistorted due to the straight line arrangement, in contrast to systems in which the beam path is curved or sharply bent. The space in advance of the entrance opening of the high-frequency mass filter is available for additional accessories, for example for an ionizing device to indicate presence of neutral particles or analysis of rest or remaining gases.

The effective conversion surface of the ion-electron converter is a few square centimeters; this substantially larger size results in substantially longer lifetime of the ion detection device. Other types of customary ion detectors have conversion surfaces of only a few square millimeters on which the effect of ions, the presence of which is to be indicated, is much more intense than on the much greater conversion surface so that it is less subject to deterioration.

Drawings, illustrating an example, in which:

FIG. 1 is a highly schematic longitudinal section through the wide-range ion mass spectrometer; and FIG. 2 is a fragmentary detail view of a portion of the arrangement of FIG. 1, to an enlarged scale.

The mass spectrometer for secondary ion mass spectroscopy essentially includes a mass filter 10 which, preferably, essentially is a quadrupole field mass filter. It is located coaxially with an ion-electron converter 12 which is used to prove the presence of the ions derived from the mass filter 10 and selected according to mass. The quadrupole field mass filter 10 is shown only schematically and has, as known, four rod-like electrodes 14. Only two of these electrodes are seen in FIG. 1. The electrodes are energized by a high-frequency voltage schematically shown as terminal HF, which provides for the mass selection. The electrodes 14 are located in a cylindrical housing 16 having axial entrance and exit openings. The ion-electron converter essentially includes a conversion electrode 18 which is, for example, hemispherical. The convex side thereof is directed towards the quadrupole field mass filter 10. The conversion electrode 18, at its concave side, has an inner conversion surface 22 which consists of a material of high secondary electron emission capability; or on which such a material is applied as a layer. An entrance opening 20, coaxial with the entrance and exit openings of housing 16, is located in the axis of symmetry of the electrode 18. The surface 22 is smoothly curved and therebeneath defines a converter chamber 19. A secondary electron sensor or transducer 24 is located in the conversion chamber 19. Transducer 24 (FIG. 2) includes a scintillation body 26 which, for example, is approximately 100 μm thick, and a secondary electron photo multiplier 28. The scintillation body 26 and the photo multiplier 28 are located within an aluminum tube 30, the front side of which is closed off by a thin electron permeable aluminum layer 32, providing for shielding which is both electrically and optically tight. The aluminum layer 32 preferably should be essentially free of pores; it may have a thickness of about 120 nm (1200 Å) applied, for example, by vapor deposition on the scintillation body 26. The edges thereof are electrically conductively connected with the metal tube 30. The metal tube 30 is secured to a flange 31 which in turn is attached to a vacuum housing 33. Flange 31 is insulated from housing 33 which, as is customary, is connected to ground or chassis potential.

An ion optical lens 36 can be located between the ion exit opening 34 of the quadrupole field mass filter 10 and the ion entrance opening 20 of the ion-electron converter. Lens 36 is constructed of two tubular parts 36a, 36b; the element 36b is formed with an aperture of diaphragm opening therein. Lens 36 is used to focus the ion beam exiting from the quadrupole field mass filter 10 onto the entrance aperture 20 of the ion-electron converter.

A diaphragm-like electrode 38 forming an adjustable aperture can be located in advance of the quadrupole mass filter 10. It can be positively biassed with respect to the sample S, forming the ion source, and thereby improve the energy band filter characteristics of the entire system.

Typical voltages for the various elements are indicated in the drawings. The sample S, placed to the right of electrode 38, emits positive ions and is placed at zero or reference potential. The voltage of the aluminum layer 32 as well as that of the metal tube 30 connected thereto can be in the order of about +50 V. To change the upper limit of the energy range to be sensed, the voltage can be varied. This is schematically indicated in FIG. 1. The housing 10 may, if desired, also be placed under a bias potential although, usually, the housing 16 of the mass filter 10 will be connected to ground or reference potential as shown.

EXAMPLE

A primary beam of $Ar^+$ ions with an energy of 8 keV was used to investigate a sample, for example of aluminum. Satisfactory mass resolution for ions of the elements of the major portion of the periodic system was obtained in a dynamic range of up to $10^5$. The aluminum layer 32 is so thick that fast ions, stray ions, neutral particles and photons which impinge on the secondary electron sensor 24 are absorbed by the layer. They do not generate any output signal. This is in contrast to the secondary electrons emitted from the conversion surface 22 which are accelerated by the electric field in the conversion chamber 19, produced by the voltage difference between the conversion electrode 22 and the tube 30 and the layer 32 and penetrate the layer. The combination, therefore, is insensitive with respect to interference and disturbances in spite of the axial symmetry and the line-of-sight connection between the sample S and the secondary electron transducer 24, all located on the same axis or beam path. The relationship of desired utilizable output signal to disturbance or noise signal is excellent in spite of the simplicity of the arrangement. The axially symmetrical arrangement permits use of a large effective entrance aperture and thus high sensitivity and good mass resolution.

Other types of mass filters may be used; the quadrupole filter 10 is an example. Generally, dynamic or high-frequency mass filters with essentially straight-line ion beam paths can be utilized, particularly linear periodic or straight linear path stability mass spectrometers or filters, as well as monopole mass filters (see Blauth, infra, l.c. chapter 5,311).

In general, any secondary ion mass spectrometer has to include an energy filter in order to cope with the elongated high-energy tail in the energy spectrum of sputtered particles. In instruments with magnetic sector fields this is the sole purpose of energy filters, e.g. of the electrostatic condenser type. With quadrupole mass analyzers, however, where both the ions to be detected and metastable neutrals as well as reflected primary ions reach the exit aperture, the retention of the two spurious particle species, which are capable of producing signals in secondary electron multipliers, is an even more important function of the energy filter.

Both these functions can be taken care of by reflection or mirror-type ion-electron converters since they act as lowpass filters-thus cutting off the high-energy tail which degrades resolution. Further, they are largely insensitive to spurious particles as well as light quanta.

First measurements with a completely on-axis assembly of target, mass-filter and converter yielded signal-to-noise ratios of up to $10^5$, as opposed to about 1 with a conventional ion detection system.

We claim:

1. Broad-range ion mass spectrometer for analysis of ions in a predetermined energy range comprising the combination of a mass filter (10)

with an ion-electron converter (12), the filter (10) and ion-electron converter (12) in said combination providing, inherently, for energy filtering in which the mass filter (10) provides for high-pass filtering above said range and the ion-electron converter inherently for low pass filtering below said range, and wherein
the mass filter (10) includes
ion beam generating means (38) to generate an essentially linear ion beam derived from the ion emitting sample (S),
and a high-frequency mass filter (14, 16) and rejecting ions having an energy level above the high end of said range passing the essentially linear ion beam therethrough
and wherein the ion-electron converter (12) includes a reflection or mirror-type ion-electron converter of generally rotation symmetrical shape with respect to an axis, said ion-electron converter having its axis aligned with said essentially linear ion beam of the high-frequency mass filter (10), having
an electrode (18) having an aperture (20) adapted to be traversed by the beam of ions from the ion source (S) after having passed through the filter (10), the electrode (18) having an electron emissive surface (22) on a side thereof which is averted from said ion source and formed as a smoothly curved concave surface defining a converter chamber (19),
means for reflecting ions that have passed through said aperture (20) unto said secondary electron emissive surface,
electrode means (30, 32) positioned within the converter chamber,
a bias voltage source means (+50 V; −20 kV) biassing the electrode means with respect to the secondary electron emissive surface (22) to reflect ions unto said secondary electron emissive surface,
and a secondary electron detector (24, 26, 28) to detect secondary electrons ejected from the secondary electron emissive surface by said ions, located within the converter chamber and positioned with respect to the secondary electron emissive surface (22) to be essentially surrounded by at least a portion thereof, and providing an output signal which will inherently be representative only of ions having an energy level above the low end of said range,
whereby the output of the secondary electron detector will be representative of the ions emitted by said sample within said energy range.

2. Ion mass spectrometer according to claim 1, further including an ion lens (36) located between the high-frequency mass filter (10) and the aperture (20) of the ion-electron converter to focus the ions exiting from the mass filter (10).

3. Ion mass spectrometer according to claim 2, wherein the ion lens comprises at least one electrode (36b) which has a voltage applied thereto accelerating the ions towards said aperture (20).

4. Ion mass spectrometer according to claim 1, further including a lens electrode (38) located between the mass filter (10) and the sample (S) and a retarding voltage applied to the electrode lens (38) filtering out low energy ions before entering the mass filter.

5. Ion mass spectrometer according to claim 1, further including a shielding means (30, 32) surrounding the secondary electron detector (26, 28), said shielding means including a window (32) permeable to secondary electrons but essentially opaque to ions, neutral particles and photons to bar or reject passage of said ions, neutral particles and photons.

6. Ion mass spectrometer according to claim 5, wherein the window (32) comprises an aluminum layer.

7. Ion mass spectrometer according to claim 6, wherein the aluminum layer is essentially non-porous and has a thickness in the order of about 120 nm.

8. Ion mass spectrometer according to claim 1, wherein the mass filter (10) is a quadrupole mass filter.

9. Ion mass spectrometer according to claim 1, wherein the mass filter is a linear-periodic mass filter.

10. Ion mass spectrometer according to claim 1, wherein the mass filter (10) is a straight-linear mass filter.

11. Ion mass spectrometer according to claim 1, wherein the mass filter is a monopole mass filter.

* * * * *